(12) United States Patent
Gottfriedsen et al.

(10) Patent No.: US 9,116,032 B2
(45) Date of Patent: Aug. 25, 2015

(54) WEIGHING DEVICE MEASURING SUM FORCES COUPLED TOGETHER FROM TWO OR MORE WEIGHBRIDGES

(71) Applicant: Wipotec Wiege-und Positioniersysteme GmbH, Kaiserslautern (DE)

(72) Inventors: Jan Gottfriedsen, Waldfischbach-Burgalben (DE); Tobias Stellwagen, Kaiserslautern (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 352 days.

(21) Appl. No.: 13/728,340

(22) Filed: Dec. 27, 2012

(65) Prior Publication Data

US 2013/0168164 A1 Jul. 4, 2013

(30) Foreign Application Priority Data

Dec. 30, 2011 (EP) .................................... 11401683

(51) Int. Cl.
*G01G 7/02* (2006.01)
*G01G 21/24* (2006.01)
*G01G 3/12* (2006.01)

(52) U.S. Cl.
CPC .. *G01G 3/12* (2013.01); *G01G 7/02* (2013.01); *G01G 21/244* (2013.01)

(58) Field of Classification Search
CPC ..... G01G 21/23; G01G 21/24; G01G 21/244; G01G 21/16; G01G 21/161; G01G 21/166; G01G 3/00; G01G 3/12; G01G 3/13; G01G 3/1414; G01G 7/02; G01L 1/044; G01L 1/2243

See application file for complete search history.

(56) References Cited

U.S. PATENT DOCUMENTS

| 4,381,826 A | 5/1983 | Kupper |
| 4,848,494 A | 7/1989 | Cornelius et al. |
| 5,373,116 A | 12/1994 | Schneider |
| 5,786,549 A | 7/1998 | Serizawa |
| 7,501,592 B2 | 3/2009 | Kuhlmann et al. |

FOREIGN PATENT DOCUMENTS

| CH | 654 660 A5 | 2/1986 |
| JP | H062173 U | 1/1994 |
| JP | 2002 107207 A | 4/2002 |
| JP | 2006113011 A | 4/2006 |

OTHER PUBLICATIONS

JPO, Notification of Reasons for Refusal issued Jan. 24, 2014 in corresponding Japanese Patent Application No. 2012-279337 (5 pages).

*Primary Examiner* — Randy W Gibson
(74) *Attorney, Agent, or Firm* — The Culbertson Group, P.C.

(57) ABSTRACT

The invention relates to a weighbridge for forming a scale, in which a load is distributed onto individual levers by means of two or more bridge elements, wherein oppositely rotating levers are coupled to one another in each bridge element in order to create a sum force in each individual bridge element. The sum forces from each bridge element are coupled via connection elements to superimpose them in order to form an overall measurement force detected by a force compensation system.

19 Claims, 3 Drawing Sheets

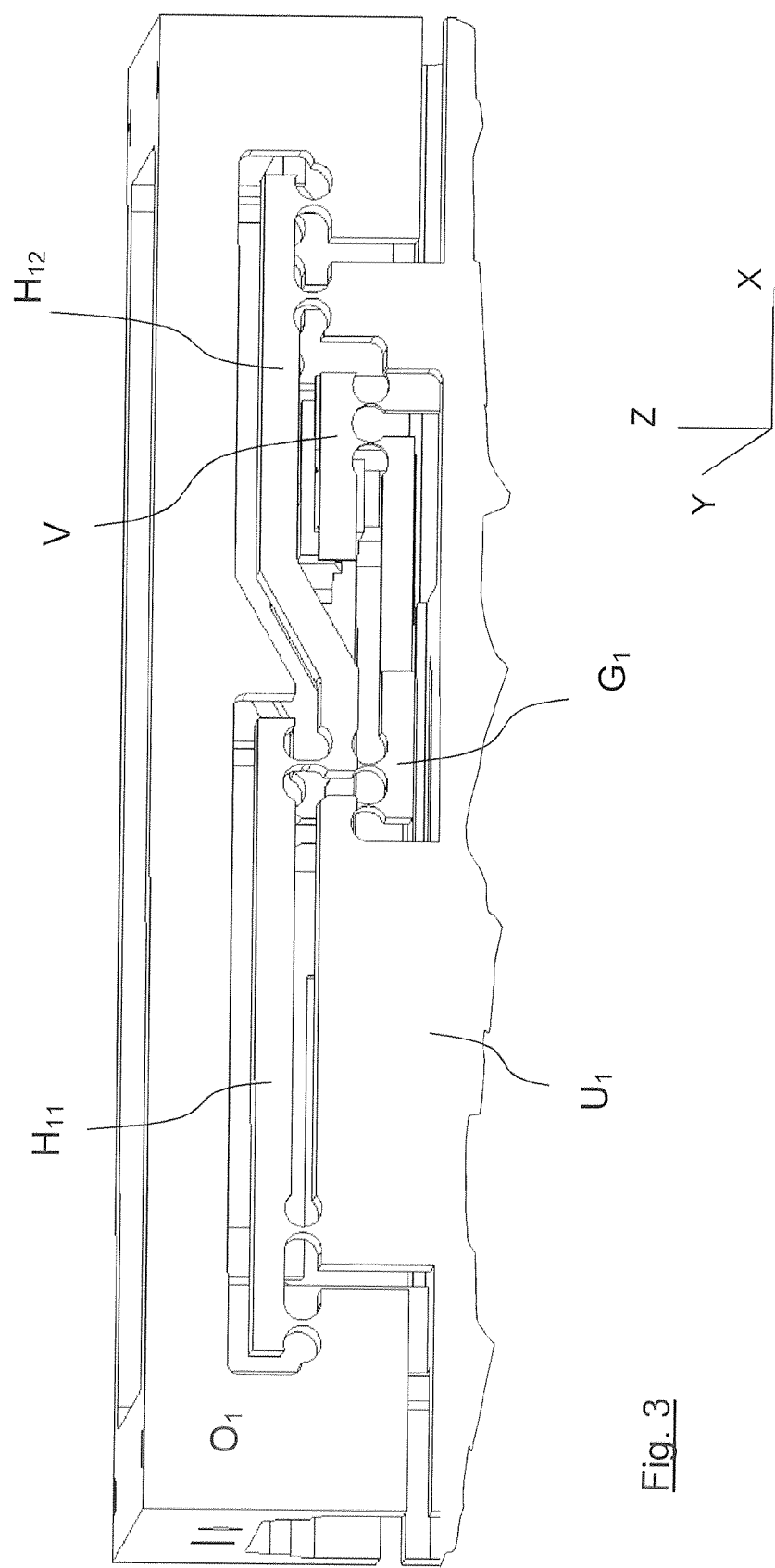

WEIGHING DEVICE MEASURING SUM FORCES COUPLED TOGETHER FROM TWO OR MORE WEIGHBRIDGES

FIELD OF THE INVENTION

The present invention relates to a weighbridge, particularly for a precision scale.

BACKGROUND

Increasingly, high metrological resolution and precision are being demanded in precision weighing technology, while simultaneously ever larger measurement ranges are to be covered by precision weighing scales. Thus products with markedly differing weights and spatial dimensions are to be weighed in continuous operation, sometimes at very high transport speeds.

Monolithically constructed weighing cells with integrated lever transmissions operating according to the principle of electrodynamic force compensation are known for use in precision scales. Such systems with single transmission are only usable up to a weight of roughly 30 kg. To extend the measurement range, a stronger magnet system can be chosen, along with the associated high costs, or the transmission ratio of the lever mechanism can be increased. In case of multiple transmissions, however, the resolution of the measurement system that can be picked up at the final lever decreases. Moreover, the production of monolithic multiple transmissions is technically elaborate and often not possible at all, due to the small amount of installation space available.

European Patent No. EP 50 708 B1 discloses a weighbridge in which the upper frame for receiving a load is coupled to a lever system, so that a pivoting or deformation of a lever section can be detected and evaluated via elongation measurement strips. The upper frame acts via two respective joints on a common lever, and the elongation measurement strips are arranged in the horizontal center of the scale.

A similar mechanism, referred to as a load sensor, is known from German Patent No. DE 69 516 860 T2. Here as well, two levers guided in the center of the scale to a force receiver are each formed over nearly the entire width of the load sensor, whereby valuable construction space in the interior of the scale or load sensor is blocked for construction. In particular, the space for additional transmission stages is thereby reduced or blocked entirely.

On the other hand, the wide design of the prior-art levers is used to reduce the sensitivity of this scale to an edge load and allows a controlled guidance of the load receiver with respect to a stationary base component of the scales.

SUMMARY OF THE INVENTION

Provided herein is a precision scale with high load capacity able to weigh materials with high resolution and metrological precision with simultaneous low sensitivity to edge loads and torques in a particularly compact design.

The precision scale herein works on the basis of distributing the total weight force to be detected onto several separate levers, with the load to be absorbed by each lever thereby reduced in order to reduce the stress on individual lever mechanisms. The forces, initially stepped down separately, are combined at a step-down stage that can be specified in design terms, in which the forces are smaller, and are then supplied to a suitable force receiver for evaluation (the terms "step down" or "step up" are to be understood to mean a targeted change of a lever force based on the respective lever arms; both terms can mean an amplification or a reduction).

A narrow or flat design of the bridge elements, preferably spaced apart from one another in parallel, of which at least two can be used to construct the weighbridge of the invention and to define the outer dimensions of the weighbridge, is of particular importance. A component force of the total load to be detected is introduced into each of these bridge elements, each of the bridge elements first stepping down the introduced component force independently of the other bridge element or elements. Only at a step down stage that can be specified in design terms, preferably the last step-down stage, are the bridge elements coupled mechanically to one another in order to form a total resulting force from the coupling, which is then transmitted to a force receiver directly or in a further stepped-down form.

The separate stepping down of individual component forces in respective compact or narrow lever mechanisms (bridge elements) allows great design freedom in the areas between the bridge elements, which can be utilized for other components of the scale. The reserved construction space can be used, for example, for housing calibration plates and weights, electronic components, vibration and acceleration sensors for a motor of a transport system, etc.

This special construction of the bridge elements used in the weighbridge according to the invention also guarantees—differently from the prior art—the introduction of the total weight force to be measured onto at least four separate levers, two of which belong to each bridge element. The component force introduced into each bridge element is stepped down independently of the other bridge elements. Because each bridge element, along with its levers, is limited to a narrow section of the weighbridge that is delimited as much as possible, there are no common levers belonging to several bridge elements on the highest step-down stage, which directly adjoins the load introduction area. Instead this highest step-down stage is in the plurality of bridge elements that are used, i.e. in two places if two bridge elements are used.

The bridge elements are coupled to one another only at a lower step-down level, which is thus less heavily loaded, in order to combine the forces separately stepped-down in each bridge element only at that point into a common resulting total measurement force to be detected with a force receiver. The bridge elements or their step-down stages are preferably constructed symmetrically to a vertical X-Z center plane, which divides a weighbridge with two bridge elements roughly in the center between the two elements.

A precise guidance of the load receivers of each individual bridge element is guaranteed by the special lever arrangement or lever coupling inside each bridge element, as described below. Load receivers of the bridge elements coupled to one another are therefore also precisely guided.

The principle of electrodynamic force compensation in particular, though not exclusively, should be considered for the conversion of the weight force into an electrically measurable form, so that the force receiver can be designed according to such a principle.

Each of the bridge elements of the weighbridge according to the invention contains force transmitting levers, with which a weight force is stepped down and/or transmitted to a force receiver of the weighbridge. Each bridge element further comprises a base section, which has a substantially elongated shape and extends in a first horizontal longitudinal direction X from one end to the opposing other end. In a second direction Y, perpendicular to the first direction and likewise horizontal, the base section is narrow. Above the base section, a load receiver, which extends in space similarly to the base section, is arranged vertically above the base section in a third direction Z, perpendicular to the two directions X and Y. A force introduced into the load receiver, which can be a component force of a weight force acting on a scale in particular, is to be stepped down with the levers, which are supported on the base section by bearing points, and is then to be transmitted to the force receiver.

The load receiver acts via a first point of action on a first lever and via a second point of action on a second lever formed separately from the first lever, so that a component force introduced into the load receiver is first distributed to these two levers and from there can be transmitted in the direction of the force receiver. The term "direction" in this context means the path which forces follow along physical components of the bridge element from the load receiver to the force receiver. With at least two bridge elements of the weighbridge, the weight force to be measured is initially subdivided into two component forces (possibly different from one another), namely one component force for each bridge element. The load receiver of each bridge element in turn distributes this component force onto the first two levers coupled to it, this division possibly also being unequal, depending on the load introduction position of the component force on the load receiver. Thus the original weight force is distributed onto four levers formed separately from one another. With a parallel arrangement of two bridge elements for the weighbridge, for example, this yields four bearing points for the four levers, by which the weight force is supported on the base sections, which enables a stable scale insensitive to an edge load.

The two levers of each bridge element are supported by a bearing point on the base section and, according to one embodiment of the invention, are coupled to one another to produce a sum force for each bridge element and to then route it to a common force receiver. From the two forces originating from the load receiver that are introduced into two different levers, this therefore results in a single, expediently stepped-down sum force for each bridge element, which can be transmitted in the bridge element and finally is to be mechanically superimposed, in unchanged magnitude or further stepped-down, with an analogously formed sum force from another bridge element.

Some versions may connect the levers initially loaded with individual forces from the load receiver to additional, mutually independent levers for stepping down forces or force transmission in order to couple the separated lever systems only after a further or later step-down stage. The levers coupled with one another to form a sum force make up a lever pair.

In monolithic weighing cells known from prior art, a parallel rod construction is used to guide the load receiver, movable in the vertical direction, with respect to a stationary base section, while the transmission and stepping down of the weight force acting on the load receiver is made possible via a lever construction additionally acting on the load receiver. To avoid this increased construction expense, another advantageous embodiment of the invention provides that the load receiver is guided by both the first and the second levers acting on the load receiver along vertical parallel lines in the Z-direction. According to this version of the invention, the first two levers replace the parallel guidance known from and required by prior art and simultaneously transmit the main load to be guided from the load receiver to the force receiver. Such a bridge element advantageously forgoes the construction of a separate parallel guide in addition to the force-transmitting levers and instead combines both functions in the levers alone. This not only reduces the production expense but also the minimum dimensions of the bridge element, and supports the preferred narrow and compact construction of the individual bridge elements.

The two levers directly coupled to the load receiver expediently act on a coupling member at a common coupling position in order to combine their lever forces there and transmit them as a sum force. Due to this coupling of the first two levers at a common coupling position and by suitable selection of the lever lengths, the load receiver experiences a parallel guidance, which was always formed in the prior art by a guide provided separately for that purpose.

The two levers, with which the respective lever forces are superimposed to form a common sum force, are advantageously coupled at the section of the coupling member configured as a joint. This can be a monolithically produced thin section at which the two separate levers attack at one side of the thin section (e.g. with successively offset-arranged connecting sections in the Y direction) while the coupling member adjoins the other side of the thin section, which is not divided there. This coupling member can then be used as an additional lever further stepping down the sum force and directly adjoining the coupling position. It is also conceivable to construct the coupling member as a connecting element joining several bridge elements, whereby the sum forces separately formed in each bridge element are combined into a common force in order to be detected by a force receiver.

The coupling can also be constructed by overlapping the ends of the levers to be coupled in the vertical direction and forming a thin section between them, in which case coupling must also be provided with the coupling member in this area.

According to one advantageous embodiment of the invention, all levers of each bridge element are arranged substantially between the load receiver and the base section of the bridge element, preferably one above another in the vertical Z direction. The bridge element thus takes on as narrow or elongated a shape as possible and is particularly suitable for application in a weighbridge, in order to limit the lever mechanisms used for stepping down largely to a narrow peripheral area of the weighbridge. Because the force transmitting levers in a weighbridge with two bridge elements, for example, are substantially limited to the area of the bridge elements themselves, the area between these bridge elements advantageously remains free as construction space for a force receiver or for other scale components such as a transport device or its motor. The reserved construction space can also be used for housing calibration plates and weights, electronic components, vibration and acceleration sensors, etc.

A particularly expedient embodiment of the weighbridge further provides that the first and second levers, each directly coupled to the load receiver, pivot in mutually opposed rotational directions when the load receiver is under a vertical load. This enables a substantially symmetrical construction of the bridge element and the formation of the above-mentioned sum force roughly in the horizontal center of the bridge element. With a symmetrical guidance of the two levers acting on the load receiver, one lever will rotate in the opposite direction from the second lever if the load receiver is under a load. For a bridge element in which these two levers are each constructed as two-armed levers and are arranged one after another in the X direction, the two respective lever arms not under a load move in the same direction, which simplifies coupling them to form the above-mentioned sum force. Precisely this arrangement also allows the particularly simple parallel guidance of the load receiver—as will be seen in the figures.

A weighbridge constructed in such a manner couples two levers pivoting in opposite directions inside a bridge element in order to form a sum force, which also applies accordingly to the other bridge elements of the weighbridge. In each bridge element, the two oppositely pivoting levers are then coupled to one another in order to form a respective sum force due to the coupling—separately for each bridge element. Unlike the prior art, in which identically running levers are coupled to one another via a traverse, the coupling in the weighbridge according to the invention uses oppositely pivoting levers, separately for each bridge element. Only the individual sum forces of each bridge element that are formed by the coupling can then be superimposed—in further stepped-down form if desired—by a connecting element connecting the individual bridge elements to one another to form a single overall measurement force resulting from a plurality of separately formed sum forces.

The weighbridge according to the invention comprises several bridge elements and is thus advantageously suitable for constructing high-resolution and accurate precision scales, in particular gravimetric scales. Such a scale comprises at least two of the above-described bridge elements, the load receivers of which are each to receive a component force of the overall weight force to be measured. The two bridge elements can be loaded by means of a scale dish resting on the two load receivers, for example. The bridge elements are expediently arranged in parallel with one another with a distance between them that corresponds, for example, roughly to the length of a bridge element. The sum forces formed in each individual bridge element are routed in the scale jointly into a connecting element that serves at least two bridge elements at the same time, in order to supply the resulting force to the force receiver or to further step it down prior to that.

In the embodiment with exactly two opposing bridge elements, the connecting element acting on the coupling members or downstream levers of each bridge element could extend from one bridge element at a right angle, for example, to the other bridge element, each bridge element introducing its respectively formed sum forces into the connecting element. At a specifiable position along the connecting element, even close to or inside one of the two bridge elements, the resulting overall force can then be picked up, further transmitted, stepped down or compensated by means of force receivers, e.g. according to the principle of force compensation.

Such a scale advantageously makes it possible to distribute the overall weight force to be measured onto several, more particularly two bridge elements, wherein each bridge element in turn—as described above—again distributes the respective introduced component force onto two levers formed separately from one another and pivoting in opposite directions, so that the overall force is initially subdivided into four component forces. The load on the lever mechanisms in the bridge elements is thereby further reduced, or the maximum detectable load is increased. Because each lever is coupled to the load receiver via a thin section in a monolithic design, the overall load for a weighbridge with two bridge elements is initially distributed across the four thin sections and introduced into the respective separate lever.

The two levers directly acted upon by each load receiver of a bridge element are separated or formed separately from one another. The term "separated" is intended to mean a physically independent construction of the lever, so that each lever has a support point of its own as the fulcrum of the lever, its own lever arms and its own force attack points, and the lever is physically identifiable and distinguishable from a different lever. "Separate" does not exclude the possibility, however, that the lever may be coupled to a different lever in the area of a force action point, or to a different section of the bridge element (also monolithically), which preferably is done in an articulated manner via a flexible thin section.

The component forces introduced into the two bridge elements can theoretically be identical, but in practice they assume different values in case of an asymmetric weight position and correspond to the overall load only in sum. The formation of the sum forces in the two bridge elements and their common introduction into the connecting element, however, ultimately results in a measurement value that again corresponds to the total load—expediently in stepped-down form.

The scale according to the invention displays the special advantage of insensitivity to edge loads that is achieved with the bridge elements. If the scale is designed in such a manner that the load to be measured is positioned inside the area circumscribed by the two opposing load receivers as seen in a vertical top view, then the scale is loaded largely free of torques acting in the X direction or the Y direction. In the prior art with a central load receiver, however, torsional loads result from weight forces that are imposed offset in the horizontal direction relative to the load receiver in a weighing dish connected thereto. This is detrimental to the accuracy and stability of conventional scales. In the scale according to the invention, however, the load receivers of the individual bridge elements jointly span an imaginary support surface, the loading of which by a weight force leads to minimum edge load sensitivity, because the imposed force is absorbed via the ends of the load receivers arranged at the vertices of the imaginary area.

Although it is conceivable to arrange the force receiver of the scale in one of the two bridge elements, an advantageous embodiment of the invention provides that the force receiver is arranged between the bridge elements of the scale in order to achieve the most symmetrical load conditions possible and/or to use the construction space existing between the bridge elements. In this case, the connecting element connecting the two bridge elements could support a component of a force receiver or force compensation system (a coil or a magnet in particular) roughly in the center between the two bridge elements, in order to compensate for a deflection of the connecting element as a function of the overall load resting on the scale. With the exception of the connecting element and the force receiver, the intermediate area formed between the bridge elements in this scale advantageously remains free of force-transferring or -transmitting levers, because they are located inside the bridge elements according to the invention.

An advantageous embodiment of the invention provides that the connecting element with which two bridge elements are connected to combine their sum forces simultaneously constitutes a coupling member in each of these two bridge elements. In this case, the component forces initially received separately in each bridge element are combined at the coupling member, which as a connecting element simultaneously represents the coupling member of the other bridge element and connects the two bridge elements to one another mechanically.

With two bridge elements, four component forces (the load receiver transmits to two levers per bridge element) are combined into two sum forces (by coupling the two separate levers into one sum force for each bridge element), and then one resulting overall force (the two sum forces are introduced into a common connecting element), wherein, due to the lever arrangement inside the individual bridge elements, the sum forces and thus the resulting force are already stepped down forms of the component forces introduced into the load receivers. The construction of connecting element and coupling member in common reduces the design effort and thus simplifies the structure of the scale. It is at the discretion of the designer whether the sum forces combined at the connecting element as a resulting force are to be further stepped-down before being supplied to the force receiver.

A particularly advantageous embodiment of the invention provides that the entire weighbridge is monolithically constructed, so that the at least two bridge elements are integrally formed with one another and their lever mechanisms are simultaneously separated from one another. Such a monolithic weighbridge preferably comprises at least two bridge elements, an upper frame, a lower frame, the levers of the bridge elements and the coupling member or connecting member.

The load receivers and base sections of each bridge element are then integrally constructed as an upper frame and lower frame used by both bridge elements. According to the invention, a connecting element that connects the two bridge elements in order to combine the respective sum forces can also be constructed monolithically, together with the bridge elements and/or upper frame and lower frame. The known advantages of the monolithic design (particularly the avoidance of heat strains) can therefore also be achieved for the weighbridge according to the invention. This possibility does not exist for weighbridges known from the prior art or it is very difficult to realize, because the interior of the weighbridge in those cases is cut off by the cross-members connecting the individual levers, and thus the lateral and vertical machining for a monolithic design is rendered more difficult or impossible. Due to the shifting of the essential transmitting functions into the bridges located at the peripheral areas of the weighbridge according to the invention, on the other hand, the interior remains largely free and offers unhindered access to all surfaces for milling and cutting tools, so that the weighbridge can be produced monolithically.

An embodiment in which the coupling member is simultaneously the connecting member and also serves as a lever that further steps down the sum forces combined from the bridge elements is also important. In this case, the connecting element can run transverse to the bridge elements and, at the center of this connection, for example, can comprise a perpendicularly projecting lever section at the end of which a component of an electromagnetic force compensation system is arranged. The sum forces combined by the connecting element are then further stepped down by this lever section to a magnitude at the free end of the lever section that can be compensated by a coil, for example.

In principle, the scale according to the invention can comprise more than two bridge elements, which can be arranged substantially arbitrarily with respect to one another. The load receivers of all bridge elements preferably are located in one plane. In a plan view, the bridge elements can constitute a triangle or some other polygon. Several bridge elements can also be arranged one alongside the other (preferably in the horizontal Y direction). The component force introduced into each load receiver is reduced by the number of bridge elements used, which increases the permissible maximum load of the scale. If more than two bridge elements are used, the scale can be constructed in such a manner that bridge elements are connected pairwise to one another via connecting elements in order to couple the sum force of two respective bridge elements in each case. The connecting elements can then be connected or coupled to one another via additional connecting elements in order to combine the sum forces of all bridge elements into one resulting force stage-by-stage. It is also an option, however, to create a first and single connecting element serving all the bridge elements, which would then receive all of the sum forces of the bridge elements at the same time. Depending on the spatial conditions and the step-down requirements, a wide variety of combinations are conceivable for coupling the individual bridge elements to one another and ultimately supplying their sum forces as a resulting force to a force receiver.

The load receivers of the individual bridge elements in a scale according to the invention are connected to one another to form a common upper frame, preferably of rigid construction, serving as load receiver. This results in an upper frame coupling the bridge elements to one another that ensures the distribution of a weight force imposed upon it into individual component forces for all load receivers. The upper frame preferably connects the individual load receivers in their respective end areas so that, in an embodiment with two opposing bridge elements, a roughly rectangular upper frame as a common load receiver results. The frame construction in which the load receivers are connected to one another at their ends leaves the interior free or freely accessible from above, so that machining space is accessible for producing the monolithic bridge elements, or space remains free for housing other components of a scale.

Although the individual load receivers for a common upper frame can in principle be detachably connected to one another by suitable connecting means, a particularly advantageous embodiment provides for integral or monolithic construction of the entire upper frame. The load receivers of the bridge elements are also integrally formed and can be connected to one another into a common upper frame. The monolithic construction of the upper frame as well as the bridge elements avoids material-dependent heat strains which can unfavorably influence the weighing result in case of pairings of different materials.

The scale obtains an additional stability due to the formation of the common upper frame. In order to construct the scale so as to be as insensitive to edge loads as possible, the frame expediently surrounds the above-described imaginary area inside of which the weight force to be measured is to be imposed from above. A weighing dish to be placed or screwed onto the frame also expediently does not extend past the outer dimensions of the upper frame, so that all load receivers experience (possibly different) component forces as pressure forces but not as tensile forces, independently of the point of attack of the weight force on the weighing dish. Due to the common formation of the individual load receivers, a common upper frame is created as the overall load receiver, the parallel guidance of which in the area of each bridge element is guaranteed by the lever arrangement of the respective bridge element.

In addition to the common or monolithic formation of the upper frame relating to all the bridge elements, the base sections of the individual bridge elements can also be combined into a common, preferably monolithic, lower frame. This further increases the stability of the scale, wherein the lower frame also preferably connects the individual base sections in their end area, analogously to the load receiver. The interior space surrounded by the lower frame can also remain freely accessible for the creation of construction space or for machining as a monolith.

According to another advantageous embodiment of the scale according to the invention, threaded connection points are provided on the load receivers of the bridge elements in order to be able to introduce the forces to be fed to the respective first or second lever of each bridge element into the load receiver as component forces. A load plate or weighing dish for receiving the material to be weighed can be fastened at these threaded connection points. In order to ensure that each bridge element experiences component forces in the area of the respective ends of the load receivers (and not via a force introduction into the middle of the load receiver), the threaded connection points are arranged in the end areas of each load receiver, wherein the horizontal distance of the threaded connection point from the respective point of action of the first or second lever is preferably smaller than the distance between two threaded connection points of the same bridge element. A first point of action of a load receiver is thus closer to the point of action via which the force of the load receiver is introduced into the associated first lever than to the other point of action. The same applies to this second point of action—it is closer to the force introduction point for the second lever than to the first point of action.

Although the scale according to the invention is preferably created based on electrodynamic force compensation, it can also use other measurement methods, e.g. oscillating sides, quartz cell or elongation measurement strips. Rotationally symmetrical force receivers are also conceivable.

The invention allows the creation of a stable and high-resolution precision scale for materials with different dimensions and different weights to be weighed. In particular, a scale with two bridge elements and an integrally constructed upper frame guarantees a high torque resistance due to a load introduction over a large area via this upper frame, the resistance being further increased by an integrally formed lower frame. The individual bridge elements, preferably spaced far apart from one another, reduce the edge load sensitivity of the scale and allow the use of large weighing platforms at the same time. The scale is resistant to horizontal load impacts, for example, and has a high natural resonant frequency. A separate parallel rod construction for guiding the load receiver with respect to the stationary part (base section), which was not used for transmitting or stepping down the force to be measured in the prior art, is advantageously obviated.

Example embodiments of the bridge element according to the invention and a scale formed therewith will be described in detail below with reference to the figures.

BRIEF SUMMARY OF THE DRAWINGS

FIG. 3 shows a side view of the weighbridge of FIG. 2.

DETAILED DESCRIPTION OF EXAMPLE EMBODIMENTS

Figure 1:
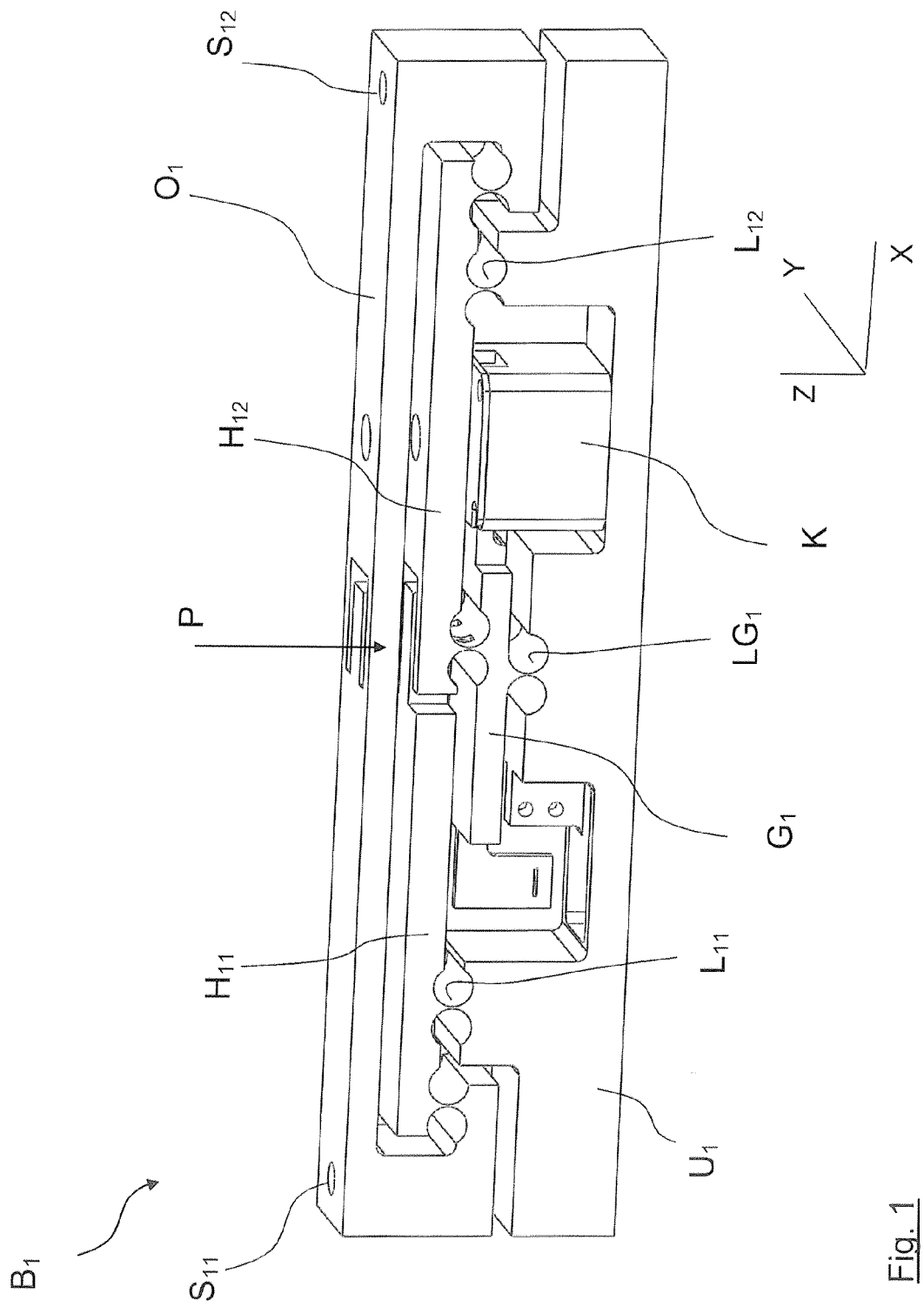
FIG. 1 shows a perspective view of a bridge element.

FIG. 1 shows a bridge element $B_1$ that extends along a first direction X from left to right in FIG. 1. The bridge element $B_1$ comprises a load receiver $O_1$ and a base section $U_1$ lying substantially congruently thereunder. The load receiver $O_1$ extends from a first end in the X direction to a second end. The base section $U_1$ correspondingly runs from a first end in the X direction to a second end. At its first end, the load receiver $O_1$ is connected via a point of action to a first lever $H_{11}$. The load receiver $O_1$ is connected in a comparable manner at its second end to a second lever $H_{12}$ via a point of action. Each of the two levers $H_{11}$ and $H_{12}$ is supported via a respective bearing point $L_{11}$ or $L_{12}$ on the base section $U_1$, which is to be considered stationary.

The load receiver $O_1$ is used for receiving a load that is preferably to be introduced in the form of possibly differing component forces via a threaded connection point $S_{11}$ at the first end and a threaded connection point $S_{12}$ at the second end of the load receiver $O_1$.

At their ends located roughly in the center of the bridge element $B_1$ in FIG. 1 that face away from the points of action, the two levers $H_{11}$ and $H_{12}$ are jointly coupled to the coupling member $G_1$ at a coupling position P, in order to superimpose or combine the lever forces of the levers $H_{11}$ and $H_{12}$ at this point. The coupled levers $H_{11}$ and $H_{12}$ can be coupled one after another in the Y direction (as in FIG. 1) or one above another in the Z direction (as in FIG. 2 or FIG. 3).

Due to the coupling of the levers $H_{11}$ and $H_{12}$ at the coupling position and by suitable selection of the lengths of the levers $H_{11}$ and $H_{12}$ (preferably equally long), the load receiver $O_1$ undergoes a parallel guidance along two vertical parallels in the downward Z direction when vertical (even unequal) component forces are introduced, in particular via a load pan or load plate mounted at the threaded connection points $S_{11}$ and $S_{12}$. The force-transferring or force-transmitting levers $H_{11}$ and $H_{12}$ inside the bridge element $B_1$ take on the transmission and stepping down of the lever forces that result from the weight force to be measured, as well as the function of parallel guidance.

(The bridge element $B_1$ could have additional levers ($H_{13}$, $H_{14}$; ... $H_{23}$, $H_{24}$ ... ), not shown here, with which the forces are transmitted either before or after coupling by a coupling member.)

The coupling member $G_1$ is likewise constructed as a lever and, like the levers $H_{11}$ and $H_{12}$, can be pivoted clockwise or counterclockwise about a thin section joint $LG_1$ formed in or on the base section $U_1$; it is subjected to the sum force of the two levers $H_{11}$ and $H_{12}$ that is formed at the coupling position. A part of a force receiver K, with which the deflection of the coupling member $G_1$ as a consequence of the load from the load receiver $O_1$ is to be compensated, is arranged at a first end of the coupling member $G_1$ (at the right end in FIG. 1). An element for position detection is arranged at the opposite, left end of the coupling member $G_1$ in order to detect and signal the deflection of this lever arm.

It can be seen from FIG. 1 that the force transferring or force stepping down levers, like the force receiver K, are completely between the load receiver $O_1$ and the base section $U_1$ so that the bridge element $B_1$ forms a compact narrow weighing cell with parallel guidance. It may also be noted that the number of thin sections that form joints can be reduced to a minimum due to the space savings resulting from the parallel rod construction of the prior art. In the case illustrated in FIG. 1, despite the division of the weight force into two component forces at the two ends of the load receiver $O_1$ and double stepping-down (stage 1: levers $H_{11}/H_{12}$, second stage: lever arm from the coupling member $G_1$ to the force receiver K) the bridge element requires a total of only six thin sections. Another thin section could be saved by forgoing the construction of the coupling member $G_1$ as a lever and instead using a direct coupling of the force receiver K in the vertical direction underneath the coupling position, which significantly simplifies the formation of the bridge element $B_1$ as a weighing cell.

The coupling member $G_1$ can simultaneously be configured as a connecting element V, in order to connect two bridge elements $B_1$, $B_2$ used in the scale to one another for combining the sum force formed in each bridge element into a single force. The connecting element V can also be used for connecting the bridge elements at a downstream step-down stage, however. The downstream step-down stage adjoins the coupling member and the latter adjoins the connecting element. The force introduced into the connecting element V then forms the sum of the once again stepped-down sum forces of each bridge element. This case can be seen in FIGS. 2 and 3.

Figure 2:
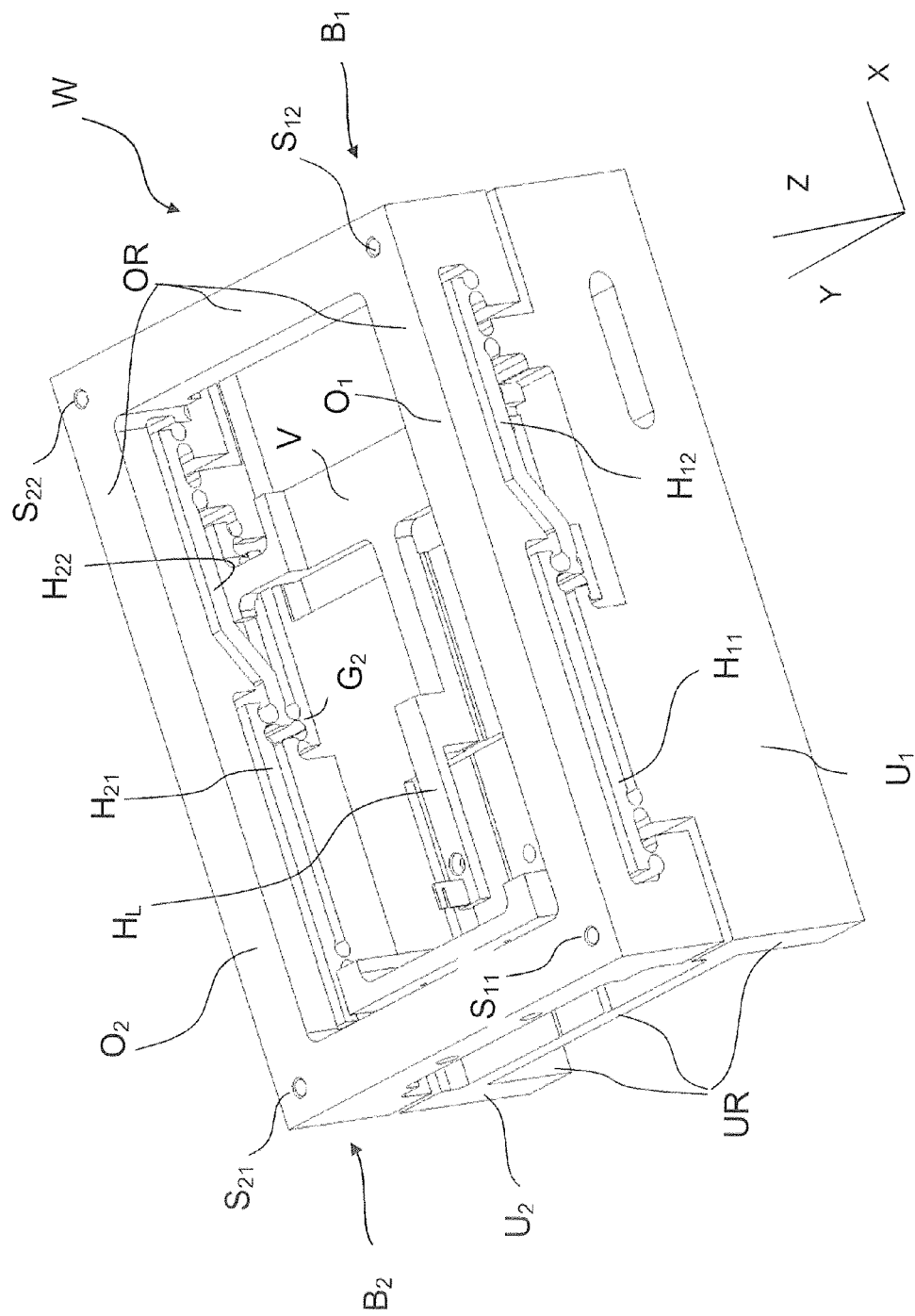
FIG. 2 shows a perspective view of a weighbridge formed from two bridge elements.

FIG. 2 shows a weighbridge W according to the invention using two bridge elements $B_1$, $B_2$. (FIG. 3 shows a schematic side view of FIG. 2 as a cutout). A first bridge element $B_1$ shown in the foreground is integrally formed with an additional bridge element $B_2$, in which the respective load receivers $O_1$, $O_2$ and the base sections $U_1$, $U_2$ are combined into a one-piece lower frame UR or upper frame OR. Threaded connection points $S_{11}$ $S_{12}$, $S_{21}$, $S_{22}$ formed on the upper frame OR for each load receiver $O_1$, $O_2$ allow the connection of a load plate or weighing dish on which the material to the weighed is to be placed.

Analogously to the individual representation of FIG. 1, the respective levers $H_{11}$, $H_{12}$, $H_{21}$, $H_{22}$ of each bridge element are again coupled to one another at a coupling position in order to form a sum force, the separate coupling members $G_1$, $G_2$ ($G_1$ is difficult to see in FIG. 2 and not labeled) being constructed for each element as levers that are supported at the left end on the lower frame UR as the pivot axis and extend substantially to the right in the X direction.

In the right section of the weighbridge W, each of the two levers of the coupling members $G_1$, $G_2$ acts on a connecting element V connecting the two bridge elements $B_1$, $B_2$, whereby the sum forces formed in each bridge element or their forces further stepped down by the levers $G_1$, $G_2$, are jointly introduced into the connecting element V. This connecting element V is likewise constructed as a lever that is supported at its right end on the lower frame UR via a bearing point acting as a pivot axis. The connecting element V is simultaneously the final lever $H_L$, which is used for stepping down. It then combines the forces formed separately by the bridge elements and extends in the area between the two opposing bridge elements by a certain amount in the X direction opposite the two coupling members $G_1$, $G_2$ (to the left in FIGS. 2 and 3). The final lever $H_L$ acts there on a force receiver or a component of a force compensation system, not shown in detail.

Unlike the bridge element $B_1$ shown in FIG. 1, the two jointly constructed bridge elements of the weighbridge according to FIG. 2 and FIG. 3 do not have a force receiver K of their own assigned to each bridge element. Because the weighbridge only combines the forces of the individual bridge elements by means of the connecting element V and this connecting element V extends in the Y direction transverse to the two bridge elements, the force receiver in this case is expediently arranged in the interior of the weighbridge, i.e. between the two bridge elements. The reserved construction space can be used for housing other scale components, calibration plates and weights, electronic components, vibration and acceleration sensors for a motor of a transport system, etc.

The first two levers of the bridge element from FIG. 1 further differ from those of FIGS. 2 and 3, because the latter respectively combine or couple a straight lever $H_{11}$ or $H_{21}$ and a bent or angled lever $H_{12}$ or $H_{22}$.

LIST OF REFERENCE CHARACTERS $B_i$ Bridge element with index i
$G_i$ Coupling member of the bridge element i
$H_{ij}$ Lever j of the bridge element i
$H_L$ Final lever
K Force receiver
$L_{ij}$ Bearing point of the lever j on the bridge element i
$O_i$ Load receiver of the bridge element i
OR Upper frame
P Coupling position
$S_{ij}$ Threaded connection point j of the load receiver i
$U_i$ Base section of the bridge element i
UR Lower frame
V Connecting element
W Weighbridge
X, Y, Z Directions in space

The invention claimed is:
1. A precision weighing device comprising:
two or more bridge elements;
a connecting element coupling the two or more bridge elements together,
wherein each bridge element comprises:
(a) a base section which extends along a first longitudinal direction (X);
(b) a load receiver, which likewise extends in the first longitudinal direction (X) and is arranged vertically above the base section in a second vertical direction (Z) perpendicular to the first longitudinal direction (X);
(c) a first lever and a second lever each extending in the first longitudinal direction (X) and arranged beneath the load receiver in the second vertical direction (Z) and each coupled to the load receiver in a manner designed to bear a load from the load receiver; and
(d) first and second bearing points formed on the base section, connected to and supporting as fulcrums the first and second levers, respectively; and
(e) wherein the first and second levers are coupled to one another at a common coupling member creating a lever pair that forms a sum force, the common coupling member coupled to the connecting element in order to transmit the sum force to the connecting element;
a force receiver coupled to the connecting element, with the connecting element coupled between the force receiver and the common coupling members of the two or more bridge elements such that the force receiver simultaneously bears the sum forces from each of the two or more bridge elements.

2. The precision weighing device of claim 1, wherein the lever pairs of two or more bridge elements face one another on either side of a vertical X-Z plane symmetrically dividing the weighbridge.

3. The precision weighing device of claim 1, wherein the connecting element extends in a third horizontal direction (Y) perpendicular to the first longitudinal direction (X), to couple the two or more bridge elements together.

4. The precision weighing device of claim 1, wherein the coupling member of each bridge element is an additional lever of the bridge element or the connecting element.

5. The precision weighing device of claim 1, wherein the respective levers coupled to one another to form a lever pair rotate in opposite directions.

6. The precision weighing device of claim 1, wherein the two or more bridge elements face spaced apart in a third horizontal direction (Y) perpendicular to the first longitudinal direction (X) leaving a space between them to accommodate additional components of the weighing device.

7. The precision weighing device of claim 1, wherein the load receiver of each respective bridge element is guided relative to the respective base section along vertical parallels in the second vertical direction (Z) by the respective first and second levers coupled to the respective load receiver.

8. The precision weighing device of claim 1, wherein the load receivers of the two or more bridge elements are integrally formed with one another in order to form a common load frame.

9. The precision weighing device of claim 8, wherein the base sections of the two or more bridge elements are connected to or integrally formed with one another in order to form a common, preferably stationary, base frame.

10. The precision weighing device of claim 8, wherein the load frame has a rectangular shape in a plan view and in its corner areas comprise respective threaded connection points which couple a weight force acting on the weighbridge as a whole into the load frame.

11. The precision weighing device of claim 1, wherein the base sections of the two or more bridge elements are integrally formed with one another in order to form a common, stationary, base frame.

12. The precision weighing device of claim 1, wherein the force receiver is arranged in a third horizontal direction (Y) laterally between the bridge elements.

13. The precision weighing device of claim 1, wherein each of the two or more bridge elements further comprises at least one additional lever coupled between its first and second levers and its force receiver for transmitting the sum force to the force receiver with a change in magnitude.

14. The precision weighing device of claim 1, in which each of the two or more bridge elements further comprises at least two additional levers coupled between its first and second levers and its load receiver for transmitting a load on the load receiver with a change in magnitude, arranged one above another in the second vertical direction (Z) between the base section and the load receiver.

15. The precision weighing device of claim 1, wherein the base sections of the two or more bridge elements are connected to one another in order to form a common, stationary, base frame.

16. The precision weighing device of claim 1, wherein the load receivers of the two or more bridge elements are connected to one another in order to form a common load frame.

17. The precision weighing device of claim 1, wherein the common coupling member includes a common coupling position at which both the first and second levers are coupled to one another to form the sum force.

18. The precision weighing device of claim 17, in which the common coupling position comprises a position along the X-axis at which the first and second levers are both coupled to the common coupling member, and further wherein the first and second levers are coupled side by side along the Y axis at the coupling position.

19. The precision weighing device of claim 17, in which the common coupling position comprises a position along the X-axis at which the first and second levers are both coupled to the common coupling member, and further wherein the first and second levers are coupled above one another along the Z axis at the common coupling position.

* * * * *

UNITED STATES PATENT AND TRADEMARK OFFICE
CERTIFICATE OF CORRECTION

| | | |
|---|---|---|
| PATENT NO. | : 9,116,032 B2 | Page 1 of 1 |
| APPLICATION NO. | : 13/728340 | |
| DATED | : August 25, 2015 | |
| INVENTOR(S) | : Jan Gottfriedsen and Tobias Stellwagen | |

It is certified that error appears in the above-identified patent and that said Letters Patent is hereby corrected as shown below:

At column 12, line 67: change "form a common, preferably stationary, base frame" to read --form a common, stationary, base frame--.

Signed and Sealed this
Ninth Day of February, 2016

Michelle K. Lee
*Director of the United States Patent and Trademark Office*